US008034425B1

(12) United States Patent
McKillip

(10) Patent No.: US 8,034,425 B1
(45) Date of Patent: Oct. 11, 2011

(54) BUSINESS FORM FOR LASER AND INKJET PRINTING DEVICES, AND METHOD FOR PRODUCING SAME

(76) Inventor: John J. McKillip, Rockford, IL (US)

( * ) Notice: Subject to any disclaimer, the term of this patent is extended or adjusted under 35 U.S.C. 154(b) by 0 days.

(21) Appl. No.: 11/022,059

(22) Filed: Dec. 22, 2004

(51) Int. Cl.
*B32B 9/00* (2006.01)
*B65D 65/28* (2006.01)
*B32B 3/00* (2006.01)

(52) U.S. Cl. ......... 428/40.1; 428/42.2; 428/43; 428/156

(58) Field of Classification Search ................. 428/41.8, 428/352, 40.1, 40.2, 41.4, 41.5, 42.2, 42.3, 428/43, 156; 283/81, 101, 105, 107, 108
See application file for complete search history.

(56) References Cited

U.S. PATENT DOCUMENTS 5,320,387 A * 6/1994 Carlson ........................... 283/75
5,337,663 A 8/1994 McKillip
5,462,488 A 10/1995 McKillip
5,842,722 A * 12/1998 Carlson ......................... 283/107
6,182,572 B1 2/2001 McKillip
6,389,971 B1 5/2002 McKillip
6,656,555 B1 12/2003 McKillip

* cited by examiner

*Primary Examiner* — Patricia L Nordmeyer

(57) ABSTRACT

A form or printing product and method for fabricating same on label formation equipment. The form includes first and second layers of material adhesively secured together. The first layer includes a card or label and a surrounding region, wherein the top and bottom surfaces of the card or label are substantially co-planar with the top and bottom surfaces, respectively, of the surrounding region. The second layer is adhered over the card or label and the surrounding region. By compressing the leading edge or trailing edge of the elevated second layer in tandem with the first layer, and thereby creating a small indentation, allows a sheet exiting a printer to bypass, travel over, or not come into contact with the second layer of the previously printed form resting in an output tray.

18 Claims, 3 Drawing Sheets

BUSINESS FORM FOR LASER AND INKJET PRINTING DEVICES, AND METHOD FOR PRODUCING SAME

CROSS-REFERENCES TO RELATED APPLICATIONS

None.

INCORPORATION-BY-REFERENCE OF MATERIAL SUBMITTED ON A COMPACT DISC

Not Applicable.

STATEMENT REGARDING FEDERALLY SPONSORED RESEARCH OR DEVELOPMENT

Not Applicable.

BACKGROUND OF THE INVENTION

1. Field of Invention

The present invention relates in general to identification cards, labels and business forms, and, in particular, to such products as include certain cards and labels, and methods of fabrication of same suitable for use on or in conjunction with flexographic printing presses, offset printing presses and other printing devices, as well as on offline finishing equipment such as manufactured by Tamarack and Hunkler.

2. Background Art

Printing products with peel-off cards, labels and the like, generally referred to herein (without limitation) as business forms, have been available in the industry for a number of years. Certain business forms of this type are shown in my U.S. Pat. No. 6,656,555, issued Dec. 2, 2003, entitled INTEGRATED FORMS AND METHOD OF MAKING SUCH FORMS. This technology, prior to the present invention can cause a finished printed form exiting certain printing devices to engage a liner on the previously printed form as it rests in a paper tray, pushing the previously printed form from the tray onto the floor, or causing the second form to back-up and damage the form or jam the print device. Such occurrences can be particularly troublesome when printing forms in sequential numbered order. Where the printed forms are confined to a holding tray, backing up of the second printed form can also cause a label to pre-dispense from the form, resulting in the danger of live pressure sensitive adhesive in the toner fusion area of the print device which can result in expensive damage to the print device.

To illustrate the above-noted problems, prior forms of the subject type such as typically used in modern laser and inkjet printers, as well as in certain other printing devices, are shown in FIGS. 1 and 2 of the drawings as a first printed form 810A and a second printed form 810B. Individual forms of this type are provided as assemblies each comprising a sheet 812 of paper or card stock, or other layer of material typically suitable for printing on, with a front side 818 and a back side 820, and a glassine or other suitable liner 842 adhered to the back side of the sheet, with a peel off label or card 814 (shown in dashed lines) established in the sheet. The liner does not cover the entire back side of the sheet, but rather covers a portion of the sheet including the card and a region 816 of the sheet surrounding the card. This results in a trailing edge 850 of the liner being exposed on the back side of the form after it has been ejected from the print device (not shown) and as it is resting on the paper holding tray 800 (indicated in dashed lines). Consequently, in print devices where forms exit (as indicated by arrow "A") such that the leading edge 824 of the second printed form 810B slides along the back side of the first form 810A in the holding tray, the leading edge 824 of the second form 810B can engage the trailing edge 850 of the liner 842 of the first form 810A, pushing the first form out of the holding tray (as indicated by the dashed arrow "B" in FIG. 2), and/or causing damage to the forms, as well as potentially causing damage to the print device, particularly when the tray includes a front lip or other arrangement that constrains movement of the forms and prevents the forms from sliding out the front of the tray.

Accordingly, an objective of the invention is to provide a business form of the above-described type, with a peel-off or otherwise (adhesively) removable card or label and liner, and an indentation established proximate the trailing edge of the liner across the width thereof to prevent the leading edge of a form exiting a printing device from engaging the trailing edge of the liner on the previously printed form as is rests in a holding tray.

Another objective of the invention is to provide a form of the subject type with the above-described indentation established proximate both top and bottom edges of the liner (across the widths thereof) to prevent a form exiting a printer from engaging the edge of the liner on a previously printed form independently of the orientation of the forms as they exit the printer.

Another objective of the invention is to provide a method for producing a form of the subject type with the above-described indentation established proximate the trailing edge of the liner.

Another objective of the invention is to provide a method for producing a form of the subject type with the above-described indentation established proximate both the top and bottom edges of the liner.

Another objective of the invention is to achieve the foregoing in a method suitable for use in conjunction with conventional printing and label formation equipment.

These and other objectives and advantages of the invention will become more apparent in light of the description, claims and drawings hereof.

BRIEF SUMMARY OF THE INVENTION

The present invention relates to business forms and similar products with labels, cards or similar members established within a printing sheet and removably secured (adhesively separable) to a liner sheet, such as forms being currently sold under the trademark INTEGRATED LABELS™ by the Integrated Labels Corporation, Rockford, Ill., and to methods for fabricating same on printing equipment, label forming equipment, and other equipment of the type typically involved in the manufacture or production of such non-printed and printed forms.

A form in accordance with the invention includes a first layer of material (e.g., a sheet of card stock or paper or thin plastic film) and a second layer of material (a liner) adhesively attached together. The sheet has a card or label or like member defined therein and a surrounding region that are overlaid by the liner, wherein the top and bottom surfaces of the card or label are substantially co-planar with the top and bottom surfaces, respectively, of the surrounding region of the sheet. In carrying out the invention, the top and/or bottom edges of the elevated liner are compressed in tandem with the associated portion of the sheet, and a small indentation (to be identified in the market as a GLIDER STRIP™) is created along the length of the liner edge, and for a width (in the direction perpendicular to the edge of the liner) as convenient in the manufacture and/or use thereof. This indentation allows a form exiting from a print device to bypass, travel over, and not engage the trailing edge of the liner of the previously printed form as it is resting in a paper tray. By eliminating the small step or elevation of the trailing edge of the liner, the present invention will prevent forms in an output tray from being pushed onto the floor by a subsequently printed form, and where the lead sheet is confined in the output tray, the invention will prevent the next sheet from backing up and potentially causing a printer malfunction. Accordingly, the present invention eliminates previously discussed malfunctions such as that can cause a label to pre-dispense, causing live pressure sensitive adhesive in the toner fusion area, which can damage or destroy the print device. The invention will allow an operator to leave the print device unattended, knowing that the above-described problems have been eliminated. The invention also ensures that sequential printed documents will stay in order in the output tray. Thus, the invention reduces the incidence of printing malfunctions that interrupt workflow when printing prior forms of the subject type. The present invention is ideal for use with modern laser and inkjet printer, and is especially useful for those who work in critical areas such as the health care field or in pharmacies, who require business forms of the subject type with labels, cards or label/form combinations.

Figure 1:
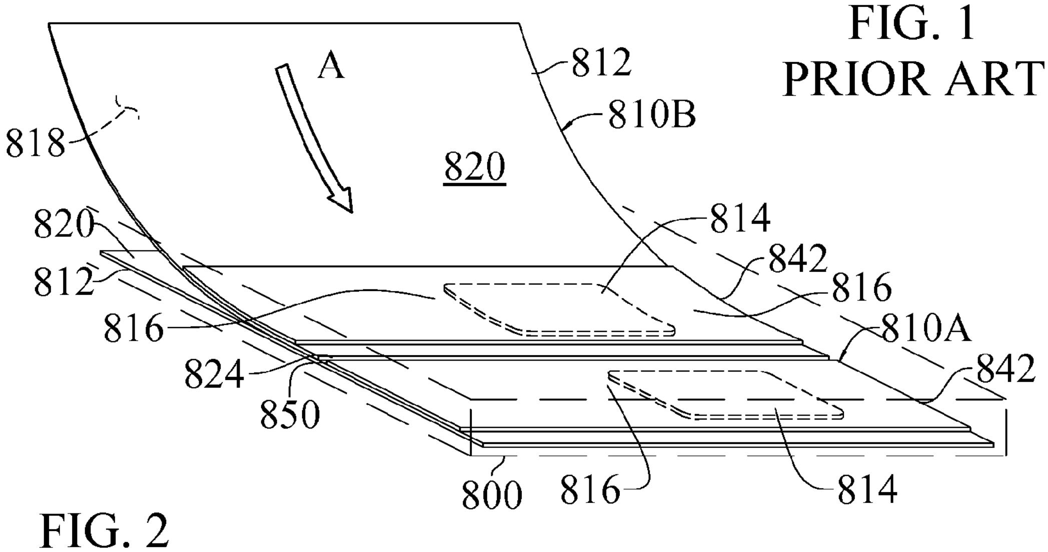
FIG. 1 PRIOR ART
FIG. 1 is a perspective view showing a prior form resting in a holding tray (shown in dashed lines) of a print device, and a second form exiting the print device prior to contacting engagement with the form in the holding tray.
Figure 2:
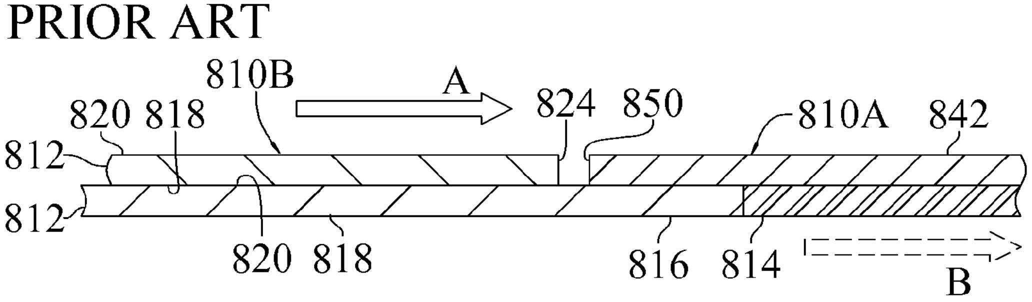
FIG. 2 PRIOR ART
FIG. 2 is an enlarged fragmentary cross-sectional view of the forms shown in FIG. 1.

While the invention is susceptible of various modifications and alternative constructions, certain preferred embodiments have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF THE INVENTION

Figure 3:
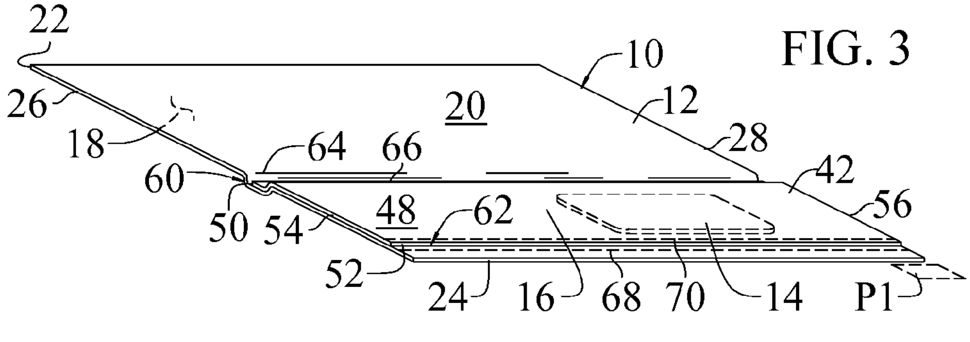
FIG. 3 is a perspective view of a form incorporating the unique aspects of the present invention.
Figure 4:
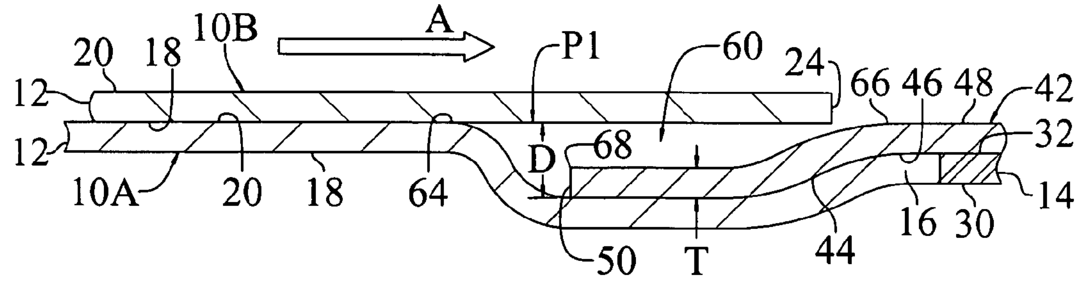
FIG. 4 is an enlarged fragmentary side cross-sectional view of the form shown in FIG. 4, with the leading edge of a second form shown as exiting a print device.

For purposes of illustration, one embodiment form 10 in accordance with the invention is shown in FIG. 3, and an enlarged fragmentary side cross-sectional view of portions of two of these forms, identified with suffix letters A and B to the reference numeral 10, (i.e., the forms are identified as 10A and 10B) for indicating first and second printed forms, respectively, is shown in FIG. 4. The form includes a sheet 12 with a label member 14 formed therein, and a border region 16 surrounding the label. The sheet is generally planar in construction, with a front surface 18, an oppositely facing back surface 20, a top edge 22, a bottom edge 24, and opposite side edges 26 and 28 to establish as generally rectangular form of the type particularly adapted for sheet feed printers such as modern laser and inkjet printers. The sheet is made from any convenient material, including but not limited to paper or card stock, or a thin plastic layer or film such as will typically be suitable for printing thereon. The label is similarly configured, with a front surface 30 that is generally co-planar with the front surface 18 of the surrounding region 16 of the sheet, a back surface 32 that is generally coplanar with the back surface 20 of the surrounding border region 16, and top, bottom, and opposite side edges.

A liner 42 is secured to the back surface 20 of the sheet 12, overlaying the label 14 and the surrounding region 16, with a thin adhesive layer as indicated at 44 (FIG. 4) between the label and at least a portion of the back surface outside the label such that the label can be peeled off of the liner and away from the front of the form as a separable member of the form. The liner is also generally planar in construction, with a front surface 46 adhered to the back surface 20 of the sheet, a back surface 48, a top edge 50, a bottom edge 52 and opposite side edges 54 and 56. The liner is typically made from glassine or other convenient material.

Additional and alternate details of forms of this type are shown and described in my McKillip, U.S. Pat. No. 6,656,555, the disclosure of which is hereby incorporated herein be reference thereto as if fully set forth herein.

In accordance with one aspect of the invention, an indentation 60, and/or a similar indentation at the location identified as 62, is formed proximate the top and bottom edges 50 and 52, respectively, of the liner 42. The indentation 60 is established across the width of the liner 42 (from side to side), below a laterally extending, forwardly breaking (i.e., sloping, curving, etc.) step or crease or generally identified as an edge formation 64 in the sheet 12 that is located above the top edge 50 of the liner, with a depth "D" at least equal to the thickness "T" of the liner at the top edge portion such that the back surface at the top edge 50 of the liner, i.e., the back corner 68 of the liner, proximate thereto is forwardly of a plane "P1" extending coextensive with the back surface 20 of the sheet portion adjacent thereto and towards which the edge 50 faces. In other words, the back corner 68 of the liner is forwardly of the back surface 20 of the exposed portion of the sheet above the top edge of the liner. In the view shown in FIG. 3, the plane P1 extends into and out of the view of the figure, perpendicular thereto, and is therefore viewed as a line (where indicated) that runs coextensive with the linear cross-sectional representation of the back surface 20 of form 10A. In the embodiment shown, the indentation 60 is further defined above an optional laterally extending, forwardly breaking edge formation 66 in the liner below the top edge 50, with an associated breaking edge formation in the sheet forwardly thereof. Similarly, an indentation at laterally extending location 62 will be formed between a forwardly breaking edge formation at dashed line 68 (FIG. 3) in the sheet, and an optional forwardly breaking edge formation at dashed 70 in the liner, with the depth "D" such that the back corner of the bottom edge 52 of the liner proximate thereto is forwardly of a plane that extends coextensive with the back surface of the sheet below the bottom edge of the liner.

With this arrangement, and as illustrated in FIG. 4, if form 10A is resting in a paper tray of a print device, then the bottom edge 24 a second form 10B will, when exiting from the printer in the direction indicated by arrow "A", slide over (rearwardly of) the top edge 50 of the liner 42 in form 10A and onto the back side 48 of the liner. As a result, the indentation 60 prevents the bottom edge 24 of a second form 10B from catching on the edge 50 of the liner 42 of the previously printed form 10A. Alternately, if the indentation is formed at 62, and a second form 10B exits the printer approaching the form 10A in the other direction, the top edge 22 of the second sheet will slide over the edge formation established at 68 in the sheet, over the bottom edge 52 (and back corner thereof) of the liner located in the indentation 62, and onto the back side of the liner at approximately the edge formation at 70. As a result, the indentations 60 and at 62 prevent a form exiting a printer from engaging and pushing against the liner of a previously printed form. (independent of orientation of the paper as it moves through the print device). As will be apparent, the width of the indentation between the edge formations 64 and 66 can be established as convenient for the indentation forming equipment (e.g., see below) or for specific use purposes, such as to enable nesting of printed forms in a holding tray.

Figure 5:
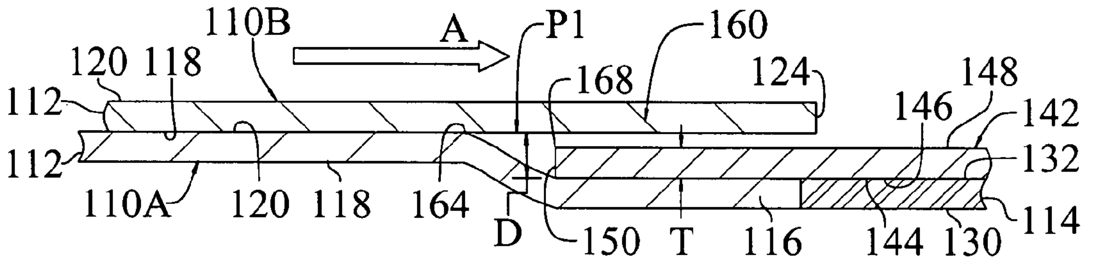
FIG. 5 is an enlarged fragmentary side cross-sectional view similar to FIG. 4 of an alternate embodiment form in accordance with the invention.

An alternate embodiment form in accordance with the invention is shown in FIG. 5 as forms 110A and 110B in which certain components and characteristics are identified with the same reference numerals as similar components and characteristics of form 10 described above but incremented by 100, and the description corresponding to the components and characteristics of form 10 above is incorporated herein in relation to such components and characteristics for the alternate form 110. In this instance, the indentation 160 (established across the width of the liner 142) is established with a single forwardly breaking step or edge formation 164 located above the top edge 150 of the liner 142 such that the back side 148 of the liner is entirely forwardly of the plane P1 that is coextensive with the back side 120 of the portion of the sheet above the indentation.

Figure 6:
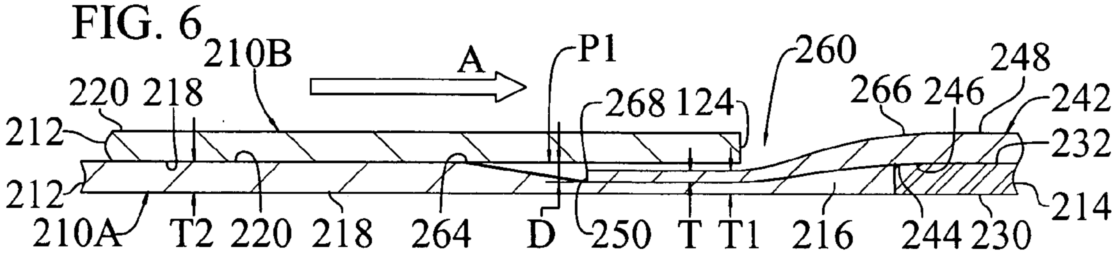
FIG. 6 is an enlarged fragmentary side cross-sectional view similar to FIG. 4 of a second alternate embodiment form in accordance with the invention.

A second alternate embodiment form in accordance with the invention is shown in FIG. 6 as forms 210A and 210B in which certain components and characteristics are identified with the same reference numerals as similar components and characteristics of form 10 described above but incremented by 200, and the description corresponding to the components and characteristics of form 10 above is incorporated herein in relation to such components and characteristics for the second alternate form 210. In this instance, the indentation 260 is formed such that the top edge 250 of the liner 242 and the associated portion of the sheet 212 forwardly thereof are compressed to a thickness T1 less than the normal thickness T2 of the sheet, and the front side 218 of the sheet is unchanged and maintained in a single plane.

Figure 7:
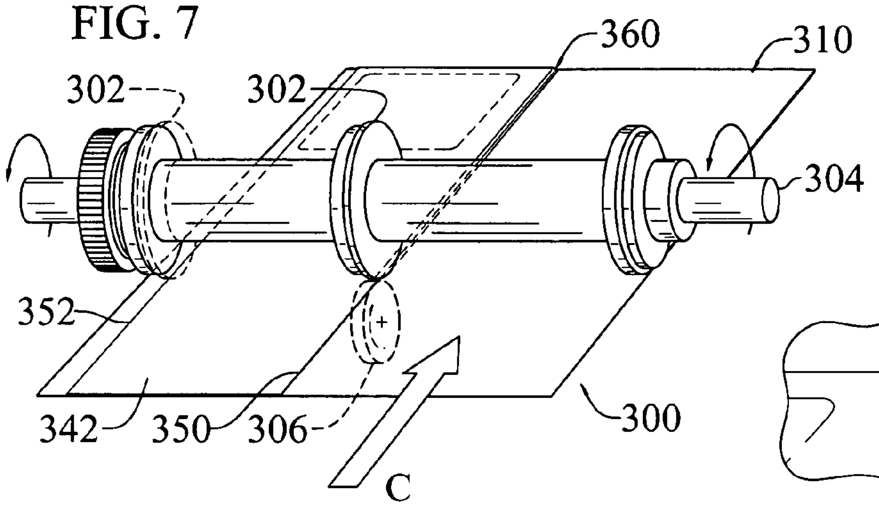
FIG. 7 is a perspective view illustrating a method in accordance with the invention, and showing a compression wheel mounted on a rotary shaft positioned over the area of the liner of a form being compressed in accordance with the invention.
Figure 7A:
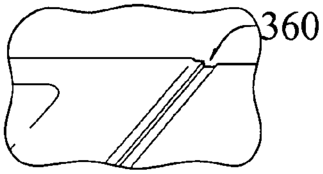
FIG. 7A is an enlarged fragmentary perspective view of a portion of the form shown in FIG. 7 after being compressed with the compression wheel.

In accordance with another aspect of the invention, a form sheet 310 is manufactured at a station 300 shown in FIG. 7 with a generally cylindrical compression wheel 302 that is mounted on a power-rotated shaft 304 to rotate against an anvil roller 306 (shown in dashed lines). The form sheet 310 is located between the compression wheel and the anvil roller, with the compression wheel positioned over the edge portion 350 of the liner 342 to be compressed, such that the indentation 360 (see e.g., enlarged view of indentation 360 in FIG. 7A) is established in the form sheet as it advances through the station between the rotating compression wheel and the anvil roller as indicated by arrow "C". In preferred embodiments, adjustable means are provided to adjust the spacing between the compression wheel and the anvil roller, as well as to adjust the pressure that compresses the paper therebetween to establish the depth of the indentation. The outer profile of the compression wheel and the outer profile of the anvil roller are provided with a size and shape to obtain the indentation depth and profile such as discussed above, and depending on the compressibility of the liner and sheet and the compression retention characteristics of the indentation established therein. The station may also/or include a second compression wheel 302 (shown in dashed lines) and associated anvil roller aligned with the opposite edge 352 of the liner when such edge is to be compressed. The mounting and operation of the compression wheel can be configured to accommodate either a continuous form sheet for subsequent cutting into individual forms such as discussed above, or individual forms such as after having been cut from a continuous web. The compression wheel can be accommodated for use on or in conjunction with presses of many different types and makes such as manufactured by Mark Andy, Propheteers, Aquaflex, Diddie, Tamarack, Hunkler, and in general on all other equipment that accommodates die cutting, tooling, etc. associated with the manufacture and/or printing of the forms. The compression wheel is utilized when the web would be creating a form that would be cross grain from the direction of travel as shown.

Figure 8:
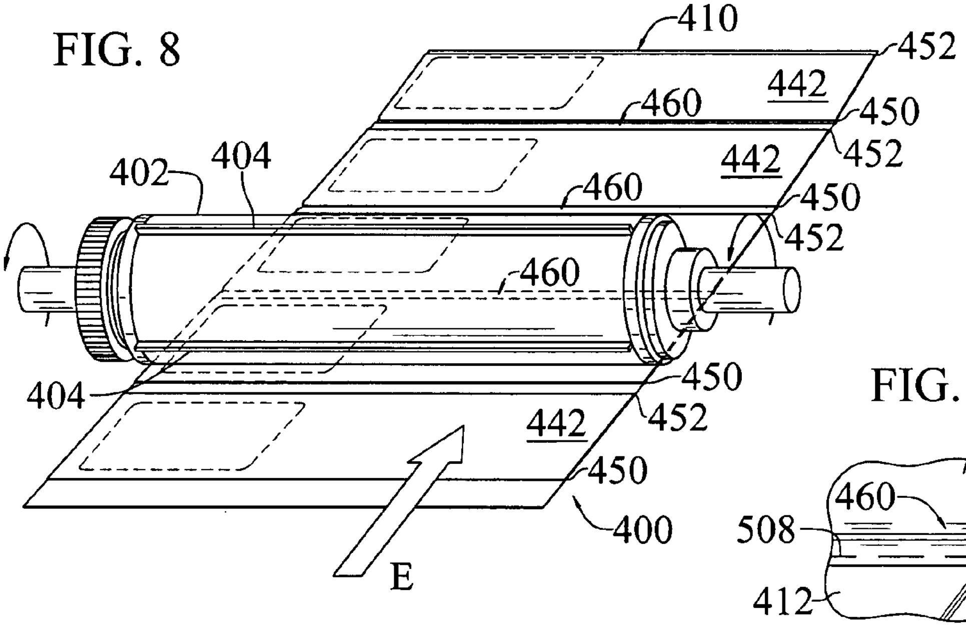
FIG. 8 is a perspective view illustrating an alternate method in accordance with the invention, and showing a compression strip on a die cylinder for an alternate arrangement establishing alternate forms in accordance with the invention.
Figure 8A:
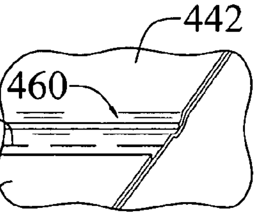
FIG. 8A is an enlarged fragmentary perspective view of a portion of the form shown in FIG. 8 after being compressed with the compression strip.
Figure 9:
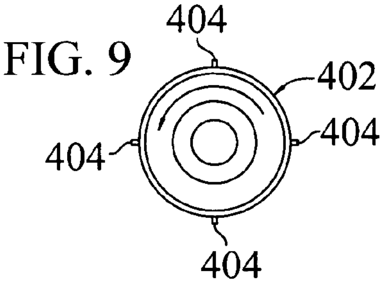
FIG. 9 is a side view of the rotary die cylinder equipped with compression strips shown in FIG. 9.
Figure 10:
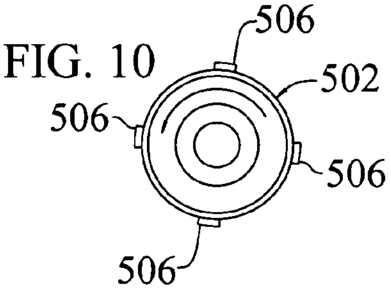
FIG. 10 is a side view of a rotary cutting die equipped with alternate compression strips.

In an alternate arrangement shown in FIG. 8, a power-rotated die cylinder 402 (side view shown in FIG. 9) is provided with one or more radially outwardly exposed linear compression strips 404. The compression strip can run the full or partial width of the die cylinder, and extend either parallel to or at a desired angle from the axis of rotation of the cylinder. In this instance, form sheet 410 is located between the die cylinder and a shaped anvil rotor (not shown, but located under the sheet in the view of FIG. 8). The angular spacing of the compression strips around the periphery of the die cylinder is set such that the strips engage the edges 450 of the liner 442 to be compressed (and/or alternately edges 452 of the liner), to establish the indentation 460 (see e.g., enlarged view of indentation 460 in FIG. 8A) in the form sheet as it advances through the station 400 under the rotating die cylinder as indicated by arrow "E". The die cylinder and compression strip can be configured to accommodate both the cross grain format form described above as well as create the same result when the form is running long grain through the station. The die cylinder and compression strip device also can be provided for use on or in conjunction with many types of printing presses, form making equipment and finishing equipment that accommodate cutting units and tooling of the type specified above and are associated with the manufacture and/or printing of such forms. As further illustration of an alternate arrangement, FIG. 10 is an end view of a die cylinder 502, similar to die cylinder 402, with angularly spaced, relatively wide compression strips 506 angularly spaced around the periphery of the cylinder for forming correspondingly sized, relatively large indentations in the forms.

It will be further understood that die cylinders equipped with compression strips of the above-described type, can be utilized in conjunction with other form equipment. For example, knives angularly spaced from the compression strips or on separate die cylinders can run the full or a partial length of the cylinder as applicable for the form sheet and liner, and can be included with an outer edge to weaken (as indicated at 508 in dashed lines), or cut the form paper or other substrate as it travels through the station after the indentation 460 has been established at each liner. This illustrates that the compression strips can be combined on rotary cutting die in current operations or form making equipment with very little modification.

From the foregoing, it will be apparent that the present invention brings to the art a new form with a separable card or label member that is uniquely adapted to prevent costly paper jams and prevent previously printed business forms of the subject type from being pushed out of the printer tray. The invention can be implemented on in-line equipment such as Mark Andys, Propheteer, Diddies and the like, as well as off-line equipment such as Tamaracks, Hunklers and the like.

The invention claimed is:

1. A form comprising:

a) a first layer of material having front and back surfaces, top and bottom edges, a separable member, and a surrounding region outside the member, the back surface of said first layer having a forwardly breaking edge formation above said surrounding region; and b) a second layer of material overlaying the separable member and surrounding region, the second layer of material not overlaying the entire first layer including the forwardly breaking edge formation; said member and the overlaying second layer having a combined maximum thickness greater than the maximum thickness of the region of the first layer not overlaid by the second layer, said second layer having a top edge with a back corner at or forwardly of the back surface of said first layer at said forwardly breaking edge formation.

2. The form as defined in claim 1 wherein said top edge of said second layer is located entirely within an indentation formed between said forwardly breaking edge formation and a second forwardly breaking edge formation in the surrounding region of the first layer overlaid by the second layer.

3. A form comprising:

a) a first layer of material having a separable member and a surrounding region outside the member, the member and surrounding region having coplanar front and back surfaces, the first layer further having a boundary with a trailing edge; and b) a second layer of material overlaying and adhering to the member and the surrounding region but not the entire first layer, said second layer further having a back surface and a boundary with trailing edge spaced from the trailing edge of the first layer within the boundary thereof; wherein there is established an overlaid region of the first layer including the separable member and surrounding region over which the second layer does extend and a non-overlaid region of the first layer located between said trailing edges over which the second layer does not extend, and wherein the second layer and the overlaid region of the first layer have a combined maximum thickness greater than the maximum thickness of said non-overlaid region of the first layer;

c) the back surface of the first layer being formed with an indentation having a forwardly breaking edge formation (i) within said non-overlaid region, (ii) between said trailing edges, and (iii) proximate to and extending along the length of the trailing edge of said second layer, the indentation further extending forwardly to a depth of at least the thickness of the trailing edge of said second layer whereby the entire thickness of the trailing edge of the second layer is located within said indentation and the back corner of the trailing edge of the second layer is at or forwardly of the back surface of said first layer adjacent said breaking edge formation.

4. A form comprising:

a) a first layer of material having
  i) front and back surfaces,
  ii) top and bottom edges, wherein the bottom edge of the first layer is the leading edge of the form, and
  iii) a separable member and a surrounding region outside the member, the member and surrounding region having coplanar front and back surfaces; and b) a second layer of material having
  i) front and back surfaces, the front surface of said second layer overlaying and adhering to the back surface of said member and surrounding region but not the entire first layer, and
  ii) top and bottom edges, wherein the top edge of the second layer is below the top edge of the first layer; and
  iii) wherein there is established (a) an overlaid region of the first layer including the separable member and surrounding region over which the second layer does extend, and (b) a non-overlaid region of the first layer located above the top edge of the second layer and over which the second layer does not extend, and
  iv) wherein the second layer and the overlaid region of the first layer have a combined maximum thickness greater than the maximum thickness of said non-overlaid region of the first layer;

c) the back surface of the first layer being formed with an indentation between said overlaid region and said non-overlaid region said indentation extending laterally along said top edge of said second laye r and forwardly to a depth of at least the thickness of said top edge of said second layer; whereby the entire thickness of the top edge of the second layer is located within said indentation and the back corner of said top edge of the second layer is at or forwardly of the back surface of said non-overlaid region of said first layer immediately above said indentation;

d) whereby the leading edge of a second form will slide over and not catch on the top edge of the second layer of a first form as said leading edge of the second form slides downwardly on the back of the first form along the thinner non-overlaid region of the first form then passes over the indentation in the first form and onto the second layer and thicker overlaid region of the first form.

5. The form as defined in claim 4 in which the indentation is established with a forwardly breaking edge formation in the non-overlaid region of said first layer above the top edge of the second layer.

6. The form as defined in claim 5 in which the indentation is further established by a second forwardly breaking edge formation in the overlaid region of said first layer below the top edge of the second layer.

7. The form as defined in claim 4 in which the first layer further includes laterally spaced opposite side edges extending between the top and bottom edges of the first layer and cooperating therewith to establish a generally rectangular form.

8. The form as defined in claim 4 in which the first layer is made from paper, card stock or resin sheet that is capable of being printed on, and the second layer is made from glassine sheet.

9. The form as defined in claim 4 in which the back surface of the first layer is compressed to establish said indentation, and said top edge of the second layer is compressed to a thickness equal to or less than the depth of the indentation whereby the back corner of said compressed top edge of the second layer is at or forwardly of the back surface of said first layer immediately above said indentation.

10. The form as defined in claim 4 in which the bottom edge of the second layer is spaced above the bottom edge of the first layer, wherein there is established a second non-overlaid region of the first layer located below the bottom edge of the second layer and over which the second layer does not extend, and the first layer is formed with a second indentation between said overlaid region and said second non-overlaid region; said second indentation extending laterally along said bottom edge of said second layer and forwardly to a depth of at least the thickness of said bottom edge of said second layer; whereby the entire thickness of the bottom edge of the second layer is located within said second indentation and the back corner of said bottom edge of said second layer is at or forwardly of the back surface of said second non-overlaid region of said first layer immediately below said second indentation.

11. A method of manufacturing a form comprising the steps of:

a) providing:
  i) a first layer of material having
    a) front and back surfaces,
    b) top and bottom edges, wherein the bottom edge of the first layer is the leading edge of the form, and
    c) a separable member and a surrounding region outside the member, the member and surrounding region having coplanar front and back surfaces; and
  ii) a second layer of material having
    a) front and back surfaces, the front surface of said second layer overlaying and adhering to the back surface of the member and surrounding region but not the entire first layer, and
    b) top and bottom edges, wherein the top edge of the second layer is below the top edge of the first layer; and
  iii) wherein there is established (a) an overlaid region of the first layer including the separable member and surrounding region over which the second layer does extend, and (b) a non-overlaid region of the first layer located above the top edge of the second layer and over which the second layer does not extend, and
  iv) wherein the second layer and the overlaid region of the first layer have a combined maximum thickness greater than the maximum thickness of said non-overlaid region of the first layer;
b) forming an indentation back surface of the first layer between said overlaid region and said non-overlaid region; said indentation extending laterally along said top edge of said second layer and forwardly to a depth of at least the thickness of said top edge of said second layer, whereby the entire thickness of the top edge of the second layer is located within said indentation and the back corner of said top edge of the second layer is at or forwardly of the back surface of the non-overlaid region of said first layer immediately above said indentation;
c) whereby the leading edge of the second form will slide over and not catch on the top edge of the second layer of a first form as said leading edge of the second form slides downwardly on the back of the first form along the thinner non-overlaid region of the first form then passes over the indentation in the first form and onto the second layer and thicker overlaid region of the first form.

12. The method as defined in claim 11 in which said forming step includes the step of rotating a wheel over said top edge of the second layer in compressive relation therewith.

13. The method as defined in claim 11 in which said forming step includes the step of advancing the first and second layers through a forming station, and rotating an operative edge of the station (a) about an axis perpendicular to the direction of travel of the layers and (b) in compressive relation with the first layer along said top edge of the second layer as it advances through the station.

14. The method as defined in claim 13 in which said top edge of the second layer is aligned with the direction of travel of the layers through the station, and said operative edge is established at the circumference of a wheel aligned with said top edge of the second layer for continuous engagement therewith as it travels through the station.

15. The method as defined in claim 14 in which the bottom edge of the second layer is spaced above the bottom edge of the first layer, wherein there is established a second non-overlaid region of the first layer located below the bottom edge of the second layer and over which the second layer does not extend, wherein the second layer and the overlaid region of the first layer have a combined maximum thickness greater than the maximum thickness of said second non-overlaid region of the first layer, and the forming step includes forming forward indentation in the back surface of said first layer along both of said top and bottom edges of the second layer with a pair of operative circumferential edges rotating about said axis in continuous compressive relation with the first layer, wherein the entire thickness of the top and bottom edges of the second layer are located within the corresponding indentations, and the back corners of said top and bottom edges of the second layer are at or forwardly of the back surfaces of the non-overlaid regions of the first layer immediate thereto.

16. The method as defined in claim 13 in which said top edge of the second layer extends generally cross-wise to the direction of travel of the layers through the station, and said operative edge is established generally cross-wise to said direction on a cylinder rotating about said axis for timed engagement with said top edge of the second layer as it advances through said station.

17. The method as defined in claim 16 in which the bottom edge of the second layer is spaced above the bottom edge of the first layer, wherein there is established a second non-overlaid region of the first layer located below the bottom edge of the second layer and over which the second layer does not extend, wherein the second layer and the overlaid region of the first layer have a combined maximum thickness greater than the maximum thickness of said second non-overlaid region of the first layer, and the forming step includes forming forward indentations in the back surface of said first layer along both of said top and bottom edges of the second layer, wherein the entire thickness of the top and bottom edges of the second layer are located within the corresponding indentations, and the back corners of said top and bottom edges of the second layer are at or forwardly of the back surfaces of the non-overlaid regions of the first layer immediate thereto.

18. The method as defined in claim 16 further comprising the step of at least weakening the first layer cross-wise to said direction of travel above and below the top and bottom edges of the second layer with at least a second operative edge of the station extending generally cross-wise to said direction and rotating on said cylinder for timed engagement with said first layer above and below the top and bottom edges of the second layer as it travels through said station.

* * * * *